United States Patent
Hong et al.

(10) Patent No.: US 9,231,685 B2
(45) Date of Patent: Jan. 5, 2016

(54) DIVERSITY BLOCKER PROTECTION

(75) Inventors: Seung-Chul Hong, Carlsbad, CA (US);
Sheng Ye, Carlsbad, CA (US); Tienyu Chang, Carlsbad, CA (US)

(73) Assignee: MaxLinear, Inc., Carlsbad, CA (US)

( * ) Notice: Subject to any disclaimer, the term of this patent is extended or adjusted under 35 U.S.C. 154(b) by 468 days.

(21) Appl. No.: 12/947,779

(22) Filed: Nov. 16, 2010

(65) Prior Publication Data

US 2011/0287725 A1 Nov. 24, 2011

Related U.S. Application Data

(60) Provisional application No. 61/261,672, filed on Nov. 16, 2009.

(51) Int. Cl.
*H04B 17/00* (2015.01)
*H04B 7/08* (2006.01)

(52) U.S. Cl.
CPC .................. *H04B 7/0814* (2013.01)

(58) Field of Classification Search
CPC ........................................ H04B 7/0814
USPC .............. 455/67.13, 90.2, 226.2, 562.1
See application file for complete search history.

(56) References Cited

U.S. PATENT DOCUMENTS

| | | | |
|---|---|---|---|
| 3,961,361 A * | 6/1976 | Avins et al. ................. | 348/603 |
| 6,965,788 B1 | 11/2005 | Barratt et al. | |
| 7,277,679 B1 | 10/2007 | Barratt et al. | |
| 2005/0184761 A1 * | 8/2005 | Isomura .................. | 327/77 |
| 2007/0129034 A1 | 6/2007 | Adams et al. | |
| 2008/0004078 A1 | 1/2008 | Barratt et al. | |
| 2008/0285686 A1 * | 11/2008 | Beaulieu et al. ............. | 375/329 |
| 2009/0002035 A1 | 1/2009 | Yamamoto et al. | |
| 2009/0258625 A1 | 10/2009 | Ling et al. | |

OTHER PUBLICATIONS

International Search Report and Written Opinion corresponding to the PCT Application No. PCT/US2010/056902, mailed on Jan. 19, 2011, 16 pages.
International Preliminary Report on Patentability with Written Opinion for PCT Application No. PCT/US2010/056902, mailed May 31, 2012; 10 pages.

* cited by examiner

*Primary Examiner* — Hsin-Chun Liao
(74) *Attorney, Agent, or Firm* — Kilpatrick Townsend & Stockton LLP

(57) ABSTRACT

A transmitting/receiving circuit includes, in part, at least one transceiver, and at least two receiving channels forming a diversity receiver. One of the receiving channels includes, in part, a saw filter, an amplifier, and a frequency converter. The other receiving channel includes, in part, an amplifier, a frequency converter, and a received signal strength indicator (RSSI) adapted to detect signals transmitted by the transceiver. The RSSI is optionally coupled to an input terminal of its associated amplifier. The receiver further includes, in part, at least one processor operative to combine signals processed through the first and second receiving channels using a weight the processor assigns to the signal received by the second receiving channel in accordance with a strength of the blocker signal that the RSSI detects. The second receiving channel optionally includes an RSSI.

18 Claims, 5 Drawing Sheets

DIVERSITY BLOCKER PROTECTION

CROSS-REFERENCES TO RELATED APPLICATIONS

The present applications claims benefit under 35 USC 119 (e) of U.S. provisional application No. 61/261,672, filed Nov. 16, 2009, entitled "Diversity Blocker Protection," the content of which is incorporated herein by reference in its entirety.

BACKGROUND OF THE INVENTION

Antenna diversity can significantly improve the performance of a wireless receiver system but also increases the cost. In order to keep the cost down, most wireless receiver systems in consumer applications use a single antenna receiver. In many handset units, the components that cause cellular transmissions (such as CDMA) are located in relatively close proximity of other wireless receivers (such as WiFi or mobile TV receivers) disposed in the handset unit. FIG. 1 shows a number of processing units of a conventional handset 100. Handset 100 is shown as having a CDMA cellular unit 110, a Bluetooth transceiver 120, a WiFi or WiMax transceiver 130, and a mobile TV receiver 140. Each of these four units is shown as having a single dedicated antenna.

FIG. 2 shows a handset unit 200 that includes, in part, a cellular CDMA transceiver 210 having an antenna 215, and a mobile TV diversity receiver 220 having antennas 225 and 230. Because of their close proximity, transmissions from cellular transceiver 210 often couple significantly to receiver 220. This problem is further compounded by the relatively high power that transceiver 210 requires to transmit data.

Referring to FIG. 1, in order to minimize the impact of the strong transmissions by CDMA cellular unit 110, on the receivers 120, 130, and 140, conventional handset units typically include a filter (that has a relatively sharp filtering characteristics) at the input of the receivers (e.g., WiFi or Mobile TV receivers.) This filtering operation is typically performed using a SAW filter which is costly and consumes a relatively large space.

FIG. 3A shows a conventional diversity receiver system 300 having two receiving channels, namely a first receiving channel 320 and a second receiving channel 340. First receiving channel 320 is shown as including a low-noise amplifier 322, a mixer 324, a filter 326, and an amplifier 328. Likewise, second receiving channel 340 is shown as including a low-noise amplifier 342, a mixer 344, a filter 346, and an amplifier 348. Diversity baseband processor 310 combines the signals it receives from first and second receiving channels 320 and 340, using any one of a number of well-known algorithms, to generate and output the sensed signal.

FIG. 3B shows a conventional diversity receiver system 350 having a pair of receiving channels 320 and 340 that are similar to the receiving channels 324 320 of FIG. 3A. Diversity receiver system 350 includes a first diversity baseband processor 325 that receives the output signal of amplifier 328, and a second diversity baseband processor 345 that receives the output signal of amplifier 348. Diversity baseband processors 325 and 345 communicate with one another to asses, in conformity with a selected diversity algorithm, the signal quality or signal-to-noise ratio (SNR) from antennas 306, 308, and to weight the signal received from each channel based on this assessment. For example, poor SNR from antenna 308 compared with the SNR from antenna 306 causes the baseband processors to assign less weight to the signal from antenna 308 than the signal from Antenna 306.

FIG. 4 shows an example of the EM radiation spectrum seen by a handset unit such as handset unit 200 shown in FIG. 2. Signal 420 is transmitted by transceiver 210 and is commonly referred to as the blocker signal. Signal 430, which has a frequency that is close to the frequency of signal 420, is the desired TV channel being received by receiver 220. Signal 420 is often a strong signal and thus can severely interfere with the reception of signal 430.

To attenuate the blocker signals, a SAW filter is commonly used in the receiving channel. FIG. 5 shows a typical transfer function 510 of a SAW filter, which as is seen, has a sharp frequency roll-off to attenuate the blocker signal 420. SAW filters are commonly used in front of sensitive receivers to provide this effect. One disadvantage of SAW filters is that they are costly and introduce non-negligible loss, thereby directly degrading the noise figure of the receiver.

Conventional diversity receivers use a SAW filter in each of the diversity channels. FIG. 6 shows a handset unit 600 that includes diversity receiving channels 610, 630, diversity baseband processor 650, and a transceiver 660. Receiving channel 610 includes a SAW filter 612, a low-noise amplifier (LNA) 614, a mixer 616, a filter 618, and an amplifier 620. Receiving channel 640 includes a SAW filter 632, an LNA 634, a mixer 636, a filter 638, and an amplifier 640. Baseband processor 650 receives the output signals of amplifiers 620 and 640, and combines them in accordance with any one of a number of well-known algorithms to generate and output the sensed signal that is received. As was described above, the inclusion of SAW filter 632 in the second receiving channel 630 increases the cost of handheld unit 600 and is thus undesirable.

BRIEF SUMMARY OF THE INVENTION

A receiver, in accordance with one embodiment of the present invention, includes, in part, first and second receiving channels. The first receiving channel includes, in part, a saw filter, an amplifier responsive to the saw filter. and a frequency converter. The second receiving channel, includes, in part, an amplifier, a frequency converter, and a received signal strength indicator (RSSI) operative to detect blocker signals.

In one embodiment, the receiver is disposed in a device which also includes a transceiver. In one embodiment, the RSSI is coupled to an input terminal of the amplifier of the second receiving channel. In one embodiment, the receiver further includes, in part, at least one processor operative to combine signals processed through the first and second receiving channels. In one embodiment, the processor is a baseband processor. In one embodiment, the processor assigns a weight to the signal received by the second receiving channel in accordance with a strength of the detected blocker signal. In one embodiment, the processor assigns a weight of zero to the signal received by the second receiving channel.

In one embodiment, the RSSI outputs a signal indicating detection of a blocker signal if a difference between the signal detected by the RSSI and the signal sensed by the first receiving channel exceeds a predetermined threshold. In another embodiment, the RSSI outputs a signal indicating detection of a blocker signal if an increase in signal detected by the RSSI does not happen with a corresponding increase in the signal sensed by the first receiving channel.

In one embodiment, the receiver further includes, in part, a by-pass circuit adapted to provide a conduction path between the amplifier of the second receiving channel and the ground potential when the RSSI detects a blocker signal. In one embodiment, the circuit includes a transistor having a gate terminal responsive to the RSSI, a first current carrying terminal coupled to an input terminal of the amplifier of the second receiving channel, and a second current carrying terminal receiving the ground potential. In some embodiment, the first receiving channel also includes, in part, an RSSI adapted to detect the blocker signal.

A method of receiving signals, in accordance with one embodiment of the present invention includes, in part, providing first and second receiving channels. The first receiving channel includes, in part, a saw filter, an amplifier responsive to the saw filter, and a frequency converter. The second receiving channel includes, in part, an amplifier, a frequency converter, and a received signal strength indicator (RSSI) operative to detect blocker signals.

In one embodiment, the method further includes, in part, placing the receiver in a device that also in which a transceiver is disposed. In one embodiment, the method further includes, in part, coupling the RSSI to an input terminal of the amplifier of the second receiving channel. In one embodiment, the method further includes combining signals processed through the first and second receiving channels. In one embodiment, the combining is performed by a baseband processor. In one embodiment, the method further includes, in part, assigning a weight to the signal received by the second receiving channel in accordance with a strength of the detected blocker signal. In one embodiment, the method further includes, in part, assigning a weight of zero to the signal received by the second receiving channel.

In one embodiment, the method further includes, in part, outputting a signal indicating detection of a blocker signal if a difference between a signal detected by the RSSI and the signal sensed by the first receiving channel exceeds a predetermined threshold. In another embodiment, the method further includes, in part, outputting a signal indicating detection of a blocker signal if an increase in signal detected by the RSSI does not occur with a corresponding increase in the signal sensed by the first receiving channel.

In one embodiment, the method further includes, in part, providing a conduction path between the amplifier of the second receiving channel and a ground terminal when the RSSI detects a blocker signal. In one embodiment, the conduction path is provided by a transistor having a gate terminal responsive to the RSSI, a first current carrying terminal coupled to an input terminal of the amplifier of the second receiving channel, and a second current carrying terminal coupled to the ground terminal. In one embodiment, the method further includes, in part, placing an RSSI in the second receiving channel.

DETAILED DESCRIPTION OF THE INVENTION

In accordance with embodiments of the present invention, a diversity receiver includes more receiving channels than SAW filters and thus has enhanced reception characteristics and costs less. A diversity receiver with two receiving channels, in accordance with embodiments of the present invention, thus dispenses the need for a second saw filter. A SAW filter is understood to refer to any surface acoustic wave filter designed to perform a filtering operation, or to any other hardware that performs the required filtering operation.

Figure 1:
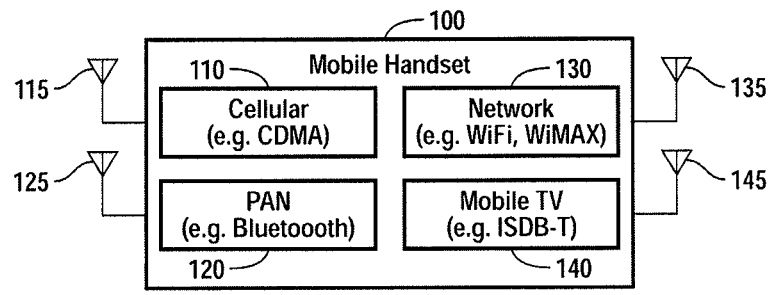
FIG. 1 shows a number of transmitting/receiving blocks of a handset unit, as known in the prior art.
Figure 2:
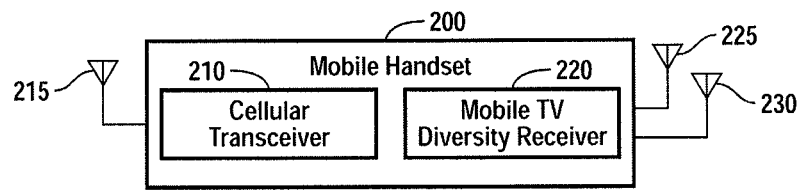
FIG. 2 shows a handset unit that includes a cellular CDMA transceiver and a mobile TV diversity receiver, as known in the prior art.
Figure 3A:
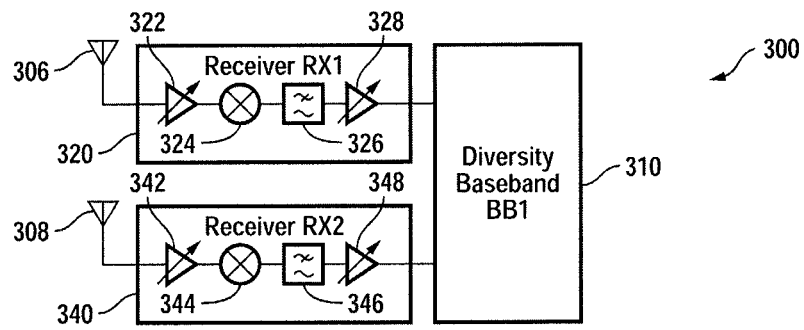
FIG. 3A shows a conventional diversity receiver system having two receiving channels sharing a diversity baseband processor, as known in the prior art.
Figure 3B:
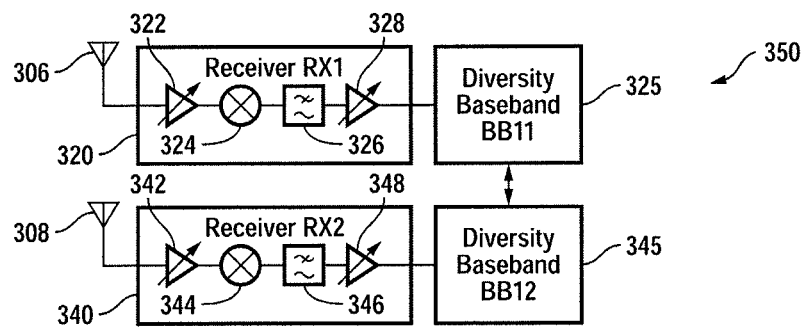
FIG. 3B shows a conventional diversity receiver system having two receiving channels each having a dedicated diversity baseband processor, as known in the prior art.
Figure 4:
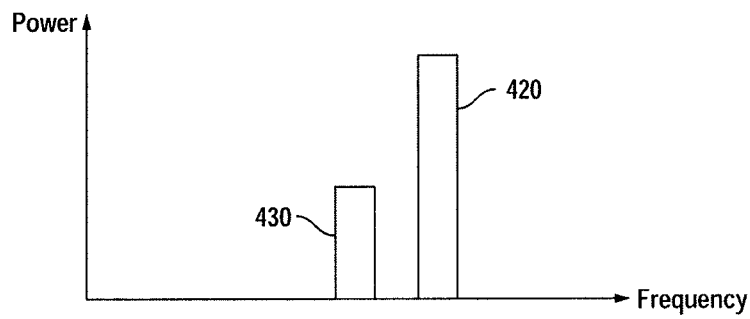
FIG. 4 shows an example of EM radiation spectrum seen by a handset, as known in the prior art.
Figure 5:
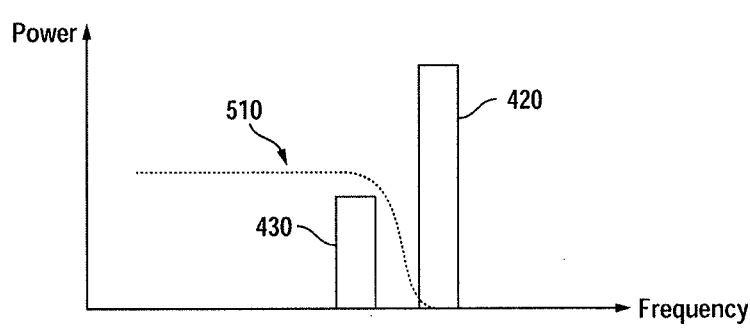
FIG. 5 shows a typical transfer function of a SAW filter used to attenuate the blocker signal of FIG. 4, as known in the prior art.
Figure 6:
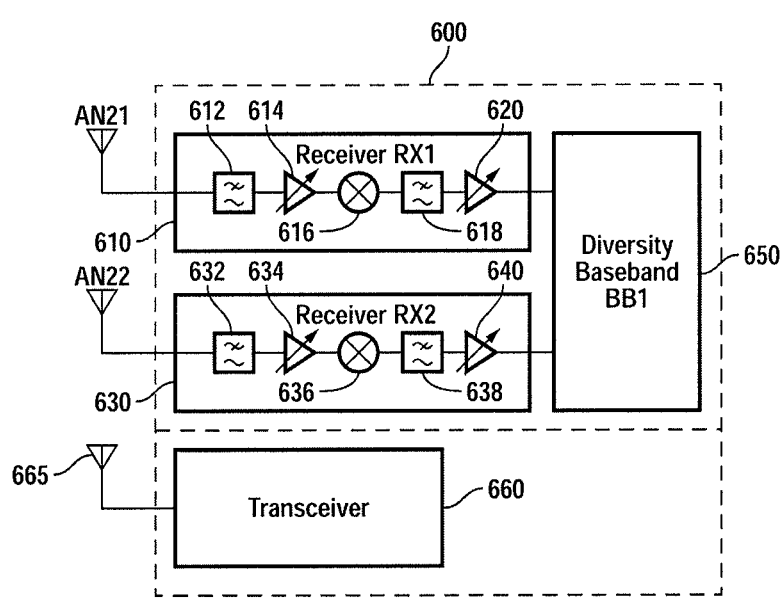
FIG. 6 shows a diversity receiver that includes a SAW filter in each of its receiving channels, as known in the prior art.
Figure 7:
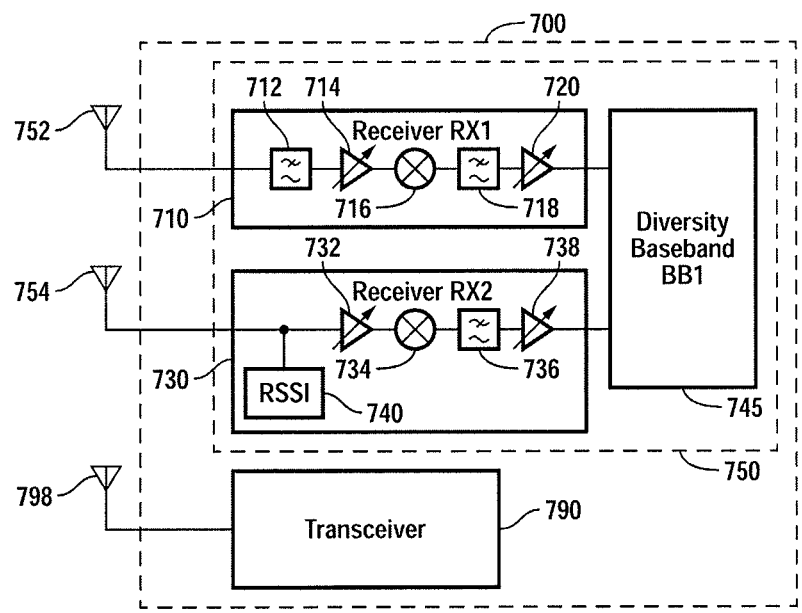
FIG. 7 is a block diagram of a handset unit that includes a diversity receiver and a transceiver, in accordance with one embodiment of the present invention.

FIG. 7 is a block diagram of a transmitting/receiving unit 700 having a receiver 750 and a transceiver 790. Although transmitting/receiving unit 700 is shown as having a receiver and a transceiver, it is understood that a transmitting/receiving unit in accordance with embodiments of the present invention may have any number of receivers, transmitters, and/or transceivers. For example, transmitting/receiving unit 700 may have CDMA, WiFi, and Bluetooth transceivers as well as a mobile TV receiver. Furthermore, a transmitting/receiving unit (which is alternatively referred to herein as a handset unit or unit) may be representative of any electronic device which places wireless systems for various standards in close proximity to one another, such as a set-top box, television, navigation system, automotive or medical device.

Diversity receiver system 750 is shown as including two receiving channels (alternatively referred to herein as receive channels), namely receiving channels 710 and 730. Receiving channel 710 is shown as including a SAW filter 712, a low-noise amplifier (LNA) 714, a mixer 716, a filter 718, and an amplifier 720. Receiving channel 730 is shown as including a received signal strength indicator (RSSI) 740, a low-noise amplifier 732, a mixer 734, a filter 736, and an amplifier 738. Although in the exemplary embodiment 700 of the present invention, RSSI 740 is shown as being positioned between antenna 754 and LNA 732, it is understood that RSSI 740 may be positioned at any other point along the receiving channel 750 in conformity with the implementation of this receiving channel. Diversity receiver system 750 is also shown as including a diversity baseband processor 745 adapted to combine the output signals of the first and second receiving channels 710 and 730, in accordance with any one of a number of well-known algorithms, to generate the sensed signal that is received by the receiver.

RSSI 740, which may be frequency-selective or broadband, is adapted to detect any blocker signal that may be generated by the transmitters, such as transceiver 790, disposed in unit 700. Because the second receiving channel 730 does not have a SAW filter, second receiving channel 730 does not suffer from a degraded noise figure that would be otherwise caused by the SAW filter when the transmitter in transceiver 790 is not transmitting. The following description of the embodiments of the present invention may be made with reference to a mobile TV receiver where the mobile TV signals are considered as the desired signals and all other signals in the spectrum are considered as blocker signals. It is understood, however, that a blocker signal is any undesired signal from the standpoint of a given receiver.

Since the diversity path associated with the second receiving channel 730 is assigned a weight of at least zero, and often more, receiver 750 operates at least as effectively as, and often better, than a receiver with a single path. Furthermore, because the second receiving channel 730 has an enhanced noise figure, as described above, receiver 750 has a better reception characteristics than conventional diversity receivers when transceiver 790 is not transmitting.

When Transceiver 790 is not transmitting, both receiving channels 710 and 730 are operated to enable diversity mode of operation for receiver 750. In this mode, diversity baseband processor 745 assigns a weight to the signal received in each receiving channel and combines these signals to generated the desired signal. Any one of a number of well known algorithms for assigning weights to, and combining the signals received in each of the receiving channels, may be used.

As described above, RSSI 740 is used to detect whether transmissions by transceiver 790 give rise to the presence of blocker signals in receiver 750. To achieve this, in one embodiment, RSSI 740 compares the strength (value) of the blocker signal it receives to a predefined threshold value. If the strength of the signal received by RSSI 740 is detected to be greater than the threshold value, RSSI 740 considers the received signal as a blocker signal. When a blocker signal is detected (by RSSI 740) as being present in the receive channel 730, diversity baseband processor 745 lowers the weight it assigns to the signal in receive channel 730 in proportion to the strength of the blocker signal detected by RSSI 740. In one embodiment, if the strength of the blocker signal exceeds a predefined value, diversity baseband processor 745 may assign a weight of zero to and thereby disregard the signal received from the receive channel 730, thus effectively making receiver 750 a single-channel receiver.

In accordance with one embodiment of the present invention, to distinguish between a blocker signal and the desired signal, the signal strength indicated by RSSI 740 is compared with the signal strength sensed by receive channel 710. The signal sensed by receive channel 710 may be sensed at an input terminal of the integrated circuit in which unit 700 is disposed or at output terminal of LNA 714. If the difference between the signal detected by RSSI 740 and the signal sensed by receive channel 710 exceeds a predetermined threshold, then the signal detected by RSSI 740 is considered a blocker signal.

In accordance with another embodiment of the present invention, to distinguish between a blocker signal and the desired signal, relatively large increases in the signal detected by RSSI 740 are kept track of. If a large increase in the signal detected by RSSI 740 occurs without a corresponding increase in the desired signal as sensed by receive channel 710, then the signal detected by RSSI 740 is considered a blocker signal. When transceiver 790 stops transmitting, receiver 750 uses receive channels 710 and 730 in accordance with the diversity mode of operation.

Figure 8:
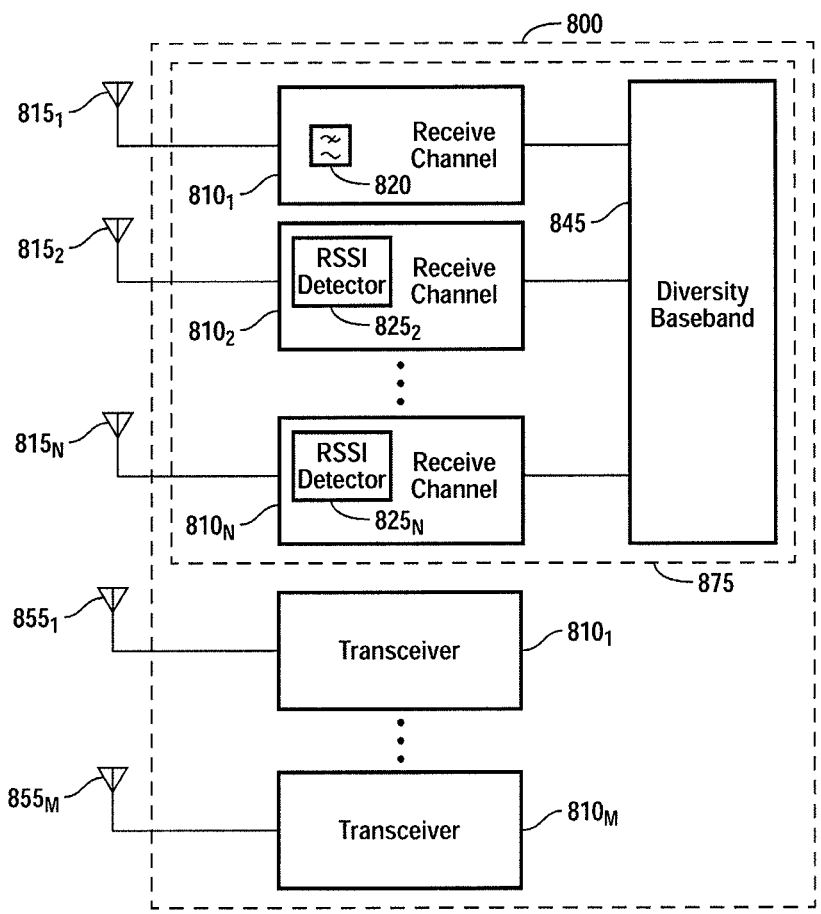
FIG. 8 is a block diagram of a handset unit that includes a diversity receiver and a transceiver, in accordance with another embodiment of the present invention.

FIG. 8 is a block diagram of a handset unit 800, in accordance with another exemplary embodiment of the present invention. Handset unit 800 is shown as including N receive channels 810$_1$, 810$_2$ . . . 810$_N$ that together form a receiver 875, and M transceivers 850$_1$, 850$_2$ . . . 850$_M$. It is understood that M and N are integers that may or may not be equal. It is further understood that a handset unit, in accordance with embodiments of the present invention may have more receivers each having a number of receiving channels.

Referring to FIG. 8, one or more of the receiving channels 810$_i$ (i is an integer varying from 1 to N) include a SAW filter, such as SAW filter 820 shown in receiving channel 810$_1$, and each of the remaining receive channels 810$_i$ includes an RSSI detector, such as RSSI detector 825$_2$ shown in receiving channel 810$_2$, and RSSI detector 825$_N$ shown in receiving channel 810$_N$. The diversity baseband processor 845 is coupled to all the receiving channels. The RSSI detectors are operated in the same manner as described above with respect to FIG. 7.

Referring to FIG. 7, the blocker signal detected by RSSI 740 may couple to LNA 714 without being filtered by filter 712, thereby adversely affecting the operation of receiver 750. To minimize this coupling, a circuit is used to attenuate or eliminate signals received by receive channel 730.

Figure 9:
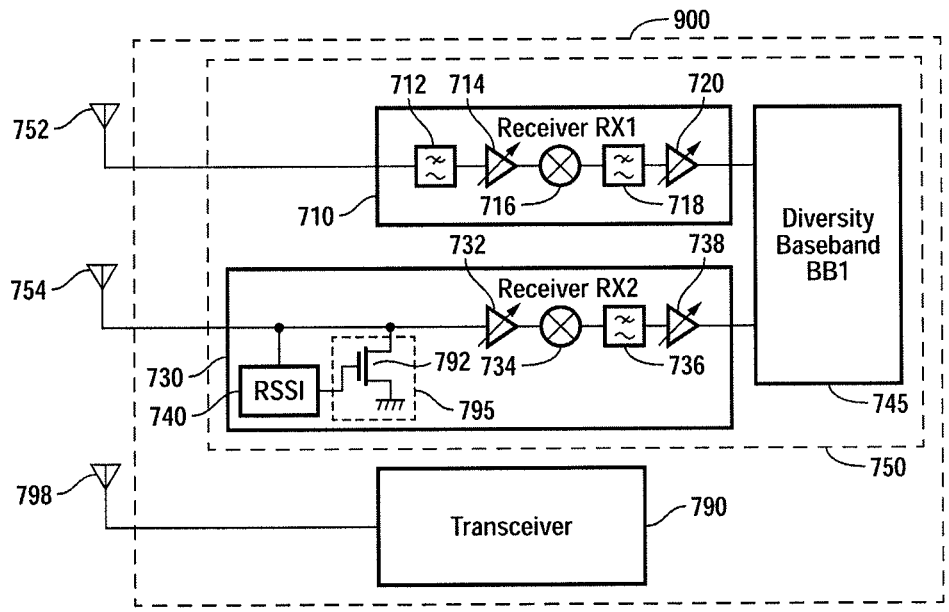
FIG. 9 is a block diagram of a handset unit that includes a diversity receiver and a transceiver, in accordance with another embodiment of the present invention.

FIG. 9 is a block diagram of a handset unit 900 that has a receiver 750 and a transceiver 790, in accordance with another embodiment of the present invention. Unit 900 is similar to unit 700 except that it includes circuit 795 in its receive path 730 adapted to attenuate or eliminate signals received by receive channel 730. Circuit 795 is shown as including a transistor 792 which operates as follows. When RSSI 740 detects a blocker signal, as described above, it causes transistor 792 to turn on, thereby providing a conduction path from signal line 794 (connecting antenna 752 to LNA 732) to the ground terminal. Depending on the voltage applied to the gate terminal of transistor 792 by RSSI 740, the path to ground of signal line 794 significantly attenuates or eliminates the undesired coupling between the two receive channels. In some embodiments, the output signal of RSSI 740 may be delivered directly to diversity baseband processor 745 to enable it to (i) more expeditiously and accurately sense the level and presence of the blocker signal, and (ii) adjust the diversity weighting more appropriately.

Figure 10:
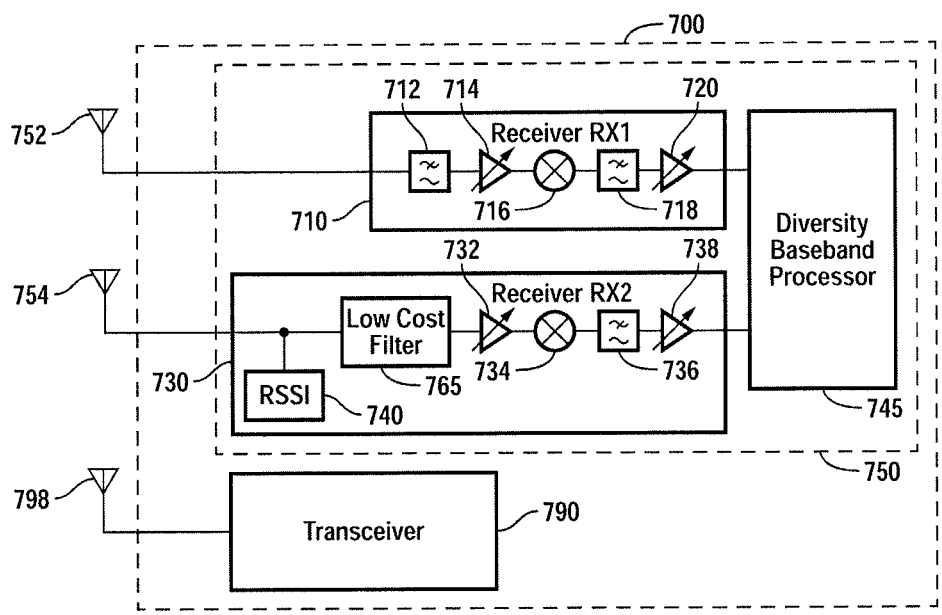
FIG. 10 is a block diagram of a handset unit that includes a diversity receiver and a transceiver, in accordance with another embodiment of the present invention.

FIG. 10 is a block diagram of a unit 1000 that has a receiver 750 and a transceiver 790, in accordance with another embodiment of the present invention. Unit 1000 is similar to unit 700 except that it includes a simple and low-cost filter 765 between antennas 754 and LNA 752 of the second receiving channel 730.

Figure 11:
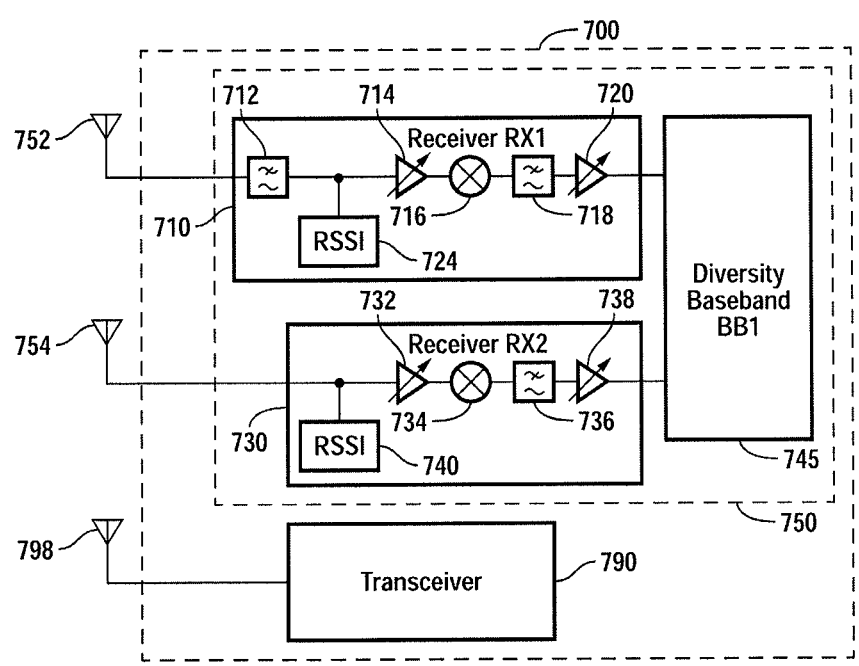
FIG. 11 is a block diagram of a handset unit that includes a diversity receiver and a transceiver, in accordance with another embodiment of the present invention.

FIG. 11 is a block diagram of a unit 1100 that has a receiver 750 and a transceiver 790, in accordance with another embodiment of the present invention. Unit 1100 is similar to unit 700 except that the receiving channel 710 of unit 110 includes an RSSI 724 to help with detection of any blocker signal that may be present in the receiver 750. Although RSSI 724 is shown as being disposed between SAW filter 712 and LNA 714, it is understood that RSSI 724 may be placed at any point along the receiving channel 710 depending on the design and implementation of the receiving channel 710.

The above embodiments of the present invention are illustrative and not limitative. Various alternatives and equivalents are possible. Other additions, subtractions or modifications are obvious in view of the present invention and are intended to fall within the scope of the appended claim.

What is claimed is:
1. A receiver comprising:
   a first receiving channel receiving a first signal and comprising:
      a saw filter;
      a first amplifier; and
      a first frequency converter; and a second receiving channel receiving a second signal and comprising:
- a second amplifier;
- a second frequency converter; and
- a received signal strength indicator (RSSI) operative to detect a strength of the second signal, said second receiving channel not to include a saw filter,
- wherein said RSSI outputs a third signal indicating whether an increase in the second signal occurs with a corresponding increase in the first signal.

2. The receiver of claim 1 wherein said receiver is disposed in a device comprising a transceiver.

3. The receiver of claim 1 wherein said RSSI is coupled to an input terminal of the second amplifier.

4. The receiver of claim 1 further comprising at least one processor operative to combine signals processed through the first and second receiving channels.

5. The receiver of claim 4 wherein said processor is a baseband processor.

6. The receiver of claim 4 wherein said processor assigns a weight to the second signal in accordance with a strength of the second signal.

7. The receiver of claim 4 wherein said RSSI outputs a signal indicating whether a difference between the first and second signals exceeds a predetermined threshold.

8. The receiver of claim 4 wherein said processor assigns a weight of zero to the second signal.

9. The receiver of claim 1 further comprising:
a by-pass circuit adapted to provide a conduction path between the second amplifier and a ground terminal.

10. A method of receiving a signal, the method comprising:
filtering a first signal received via a first receiving channel via a saw filter;
amplifying the first signal;
downconverting a frequency of the first signal;
determining a strength of a second signal received via a second receiving channel, said second receiving channel not include a saw filter;
amplifying the second signal;
downconverting a frequency of the second signal; and
determining whether an increase in the second signal occurs with a corresponding increase in the first signal.

11. The method of claim 10 further comprising:
placing the receiver in a device; and
placing a transceiver in the device.

12. The method of claim 10 further comprising:
receiving the second signal via an antenna disposed in the second receiving channel.

13. The method of claim 10 further comprising:
combining the first and second signals.

14. The method of claim 13 wherein said combining is performed by a baseband processor.

15. The method of claim 13 further comprising:
assigning a weight to the second signal in accordance with the strength of the second signal.

16. The method of claim 13 further comprising:
determining whether a difference between the first and second signals exceeds a predetermined threshold.

17. The method of claim 13 further comprising:
assigning a weight of zero to the second signal.

18. The method of claim 10 further comprising:
providing a conduction path between an amplifier amplifying the second signal and a ground terminal.

* * * * *